(12) United States Patent
Ariizumi et al.

(10) Patent No.: US 10,121,252 B2
(45) Date of Patent: *Nov. 6, 2018

(54) IMAGE PROCESSING APPARATUS AND IMAGE PROCESSING METHOD

(71) Applicant: CANON KABUSHIKI KAISHA, Tokyo (JP)

(72) Inventors: Masahiro Ariizumi, Tokyo (JP); Noriyasu Hashiguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/343,319

(22) Filed: Nov. 4, 2016

(65) Prior Publication Data

US 2017/0053415 A1 Feb. 23, 2017

Related U.S. Application Data

(63) Continuation of application No. 14/827,734, filed on Aug. 17, 2015, now Pat. No. 9,519,974.

(30) Foreign Application Priority Data

Aug. 20, 2014 (JP) ................................. 2014-167959

(51) Int. Cl.
*G06T 7/00* (2017.01)
*G06T 1/60* (2006.01)
(Continued)

(52) U.S. Cl.
CPC .......... *G06T 7/0081* (2013.01); *G06K 9/6223* (2013.01); *G06T 1/60* (2013.01);
(Continued)

(58) Field of Classification Search
CPC ... G06T 7/0081; G06T 7/0083; G06K 9/4638; G06K 9/342; G06K 9/2054
See application file for complete search history.

(56) References Cited

U.S. PATENT DOCUMENTS 5,850,475 A 12/1998 Kasao
6,021,220 A 2/2000 Anderholm
(Continued)

FOREIGN PATENT DOCUMENTS

JP 8-30787 A 2/1996

OTHER PUBLICATIONS

Radhakrishna Achanta, et al., "SLIC Superpixels Compared to State-of-the-Art Superpixel Methods," Journal of Latex Class Files, vol. 6, No. 1, pp. 1-8, Dec. 2011.

*Primary Examiner* — Duy M Dang
(74) *Attorney, Agent, or Firm* — Fitzpatrick, Cella, Harper & Scinto

(57) ABSTRACT

Plural block images are generated by dividing an input image into blocks each of which has a predetermined size. Clustering of pixels contained in the plural block images is performed based on a representative point associated with each of those block images to apply region segmentation to those block images. The representative point is a part of plural representative points disposed in the input image. The clustering in a target block image of the region segmentation is performed by referring to a representative point in the target block image, a representative point of a processed block image, and a representative point of an unprocessed block image. The processed and unprocessed block images are adjacent to the target block image.

18 Claims, 7 Drawing Sheets

(51) Int. Cl.
*G06T 7/11* (2017.01)
*G06T 7/187* (2017.01)
*G06K 9/62* (2006.01)
*G06T 7/40* (2017.01)
*G06T 7/174* (2017.01)
*G06T 7/90* (2017.01)

(52) U.S. Cl.
CPC ................ *G06T 7/11* (2017.01); *G06T 7/174* (2017.01); *G06T 7/187* (2017.01); *G06T 7/40* (2013.01); *G06T 7/90* (2017.01); *G06T 2207/10024* (2013.01); *G06T 2207/20021* (2013.01)

(56) References Cited

U.S. PATENT DOCUMENTS 8,712,167 B2     4/2014   Hashiguchi
9,519,974 B2 *   12/2016   Ariizumi .................. G06T 7/11

* cited by examiner

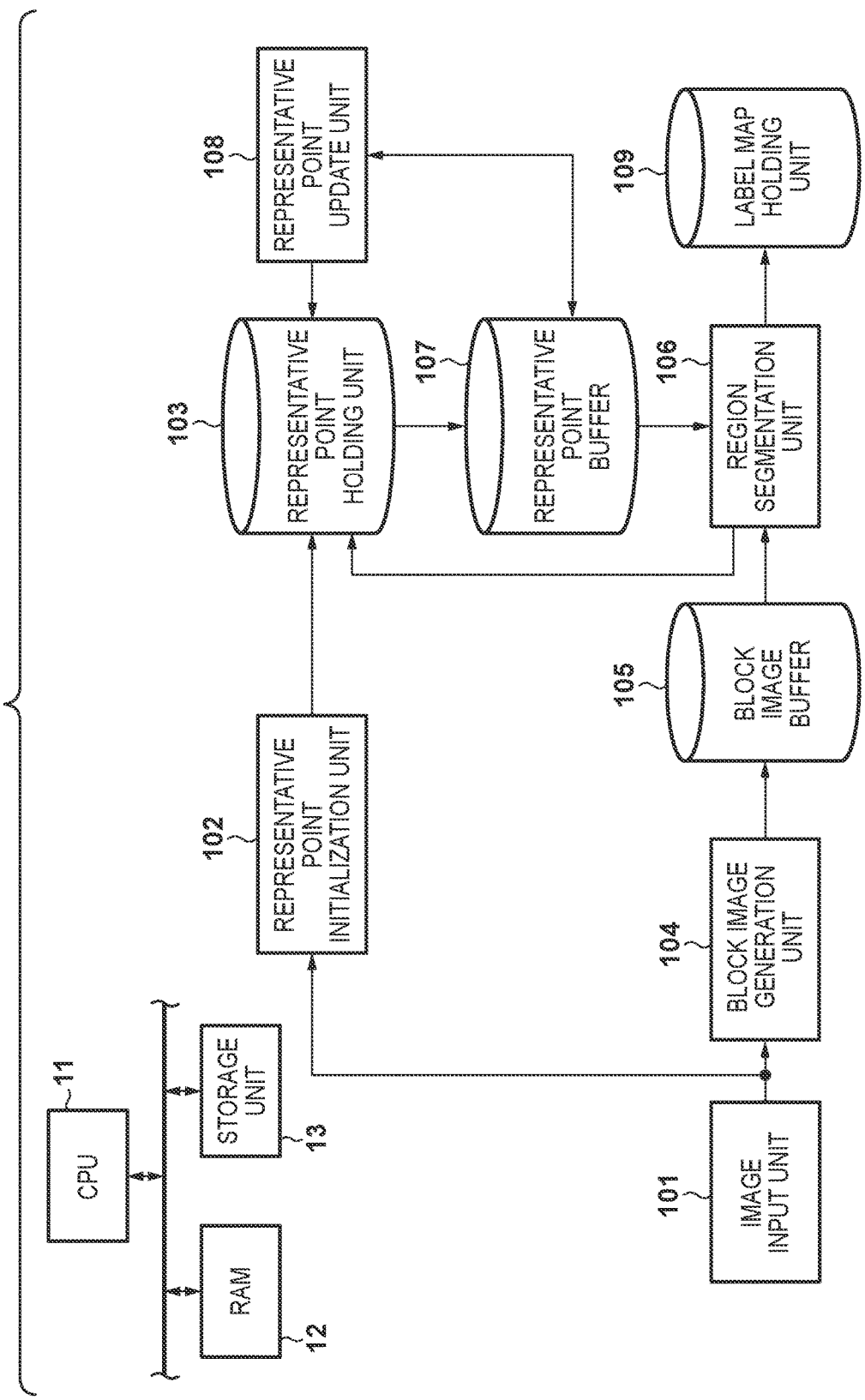

IMAGE PROCESSING APPARATUS AND IMAGE PROCESSING METHOD

This application is a continuation of application Ser. No. 14/827,734, filed Aug. 17, 2015.

BACKGROUND OF THE INVENTION

Field of the Invention

The present invention relates to image processing of performing region segmentation of an image.

Description of the Related Art

A region segmentation method is used as a technique of dividing an image into regions similar in attribute such as color, texture, or brightness. By performing coding processing, image processing, and image recognition processing for each region divided from the image, the processing amount can be reduced in comparison with a case in which these processes are performed for each pixel. Recently, in a growing number of cases, image processing is performed on a high-resolution image in a built-in device. The region segmentation technique for reducing the processing amount is receiving attention.

A region segmentation method described in literature 1 is a method of performing region segmentation of an image quickly. Literature 1 discloses a region segmentation method by clustering based on the K-Means method using color information and coordinate information. The technique described in literature 1 speeds up processing by restricting the reference range of the representative point of a region serving as a cluster center in a coordinate space.

Literature 1: Radhakrishna Achanta, et al., "SLIC Superpixels Compared to State-of-the-Art Superpixel Methods", IEEE Transactions on Pattern Analysis and Machine Intelligence, vol. 34, No. 11, pp. 2274-2282, November 2012

In region segmentation by clustering described in literature 1 or the like, clustering and update processing of a representative point need to be repeated for each image. When an image present in a main memory is repetitively transferred to a region segmentation apparatus, the transfer band of the main memory increases. If a working memory capable of high-speed processing for buffering an image in the main memory is prepared, and an image is repetitively transferred from the working memory to the region segmentation apparatus, the transfer band of the main memory can be reduced. However, when such a working memory is used, the working memory needs to have a large memory capacity in order to hold all the regions of an image, raising the cost.

In order to reduce the memory capacity of the working memory for buffering an image, it is also effective to divide an image into a plurality of blocks (to be referred to as "block images" hereinafter), and perform region segmentation for each block image. However, when region segmentation is applied to each of the block images, a region boundary arising from the shape of a block appears.

Japanese Patent Laid-Open No. 8-30787 (literature 2) proposes a method of performing region segmentation using a small-capacity working memory. Literature 2 discloses a method of reducing the working memory by repeating clustering and updating of a representative point for each block image. In literature 2, an overlap of pixels is provided between blocks. As for the overlap region, each of a plurality of blocks including this region is subjected to region segmentation processing. The appearance of a region boundary arising from the shape of a block is reduced by referring to even data of a block image having undergone region segmentation, in addition to data of a block image during region segmentation.

However, the region segmentation method by clustering for each block image, which is described in literature 2, requires an overlap of pixels between adjacent block images. When performing region segmentation of a given block image, even an image at a portion overlapping an adjacent block image is referred to, in addition to the given block image. For this purpose, a working memory larger in memory capacity than the block image is necessary.

SUMMARY OF THE INVENTION

In one aspect, an image processing apparatus for performing region segmentation of an image, comprising: a generation unit configured to generate a plurality of block images by dividing an input image into blocks each of which has a predetermined size; a segmentation unit configured to perform clustering of pixels contained in the plurality of block images based on a representative point associated with each of those block images so as to apply the region segmentation to those block images, wherein the representative point is a part of a plurality of representative points disposed in the input image, wherein the clustering in a target block image of the region segmentation is performed by referring to a representative point in the target block image, a representative point of a processed block image on which the region segmentation has been performed, and a representative point of an unprocessed block image on which the region segmentation has not been performed yet, and the processed block image and the unprocessed block image are adjacent to the target block image.

According to the aspect, when performing region segmentation of each block image, the memory capacity of a working memory that holds the block image can be reduced.

Further features of the present invention will become apparent from the following description of exemplary embodiments with reference to the attached drawings.

BRIEF DESCRIPTION OF THE DRAWINGS

FIG. 1 is a block diagram showing the arrangement of an image processing apparatus that performs region segmentation processing according to the first embodiment.

DESCRIPTION OF THE EMBODIMENTS

Figure 2A:
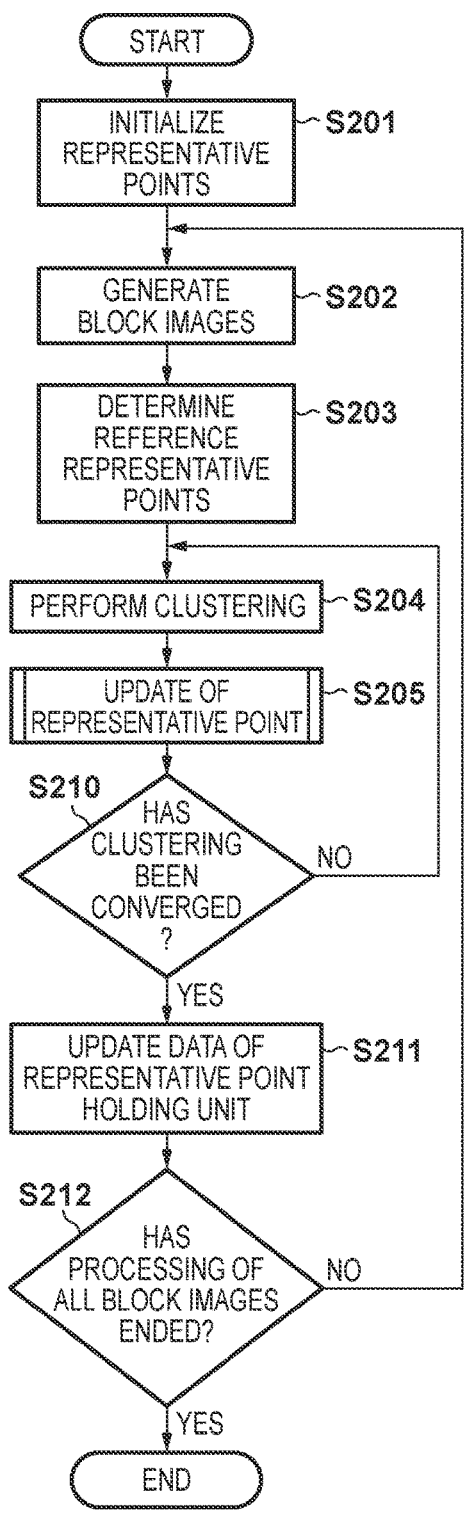
FIGS. 2A and 2B are flowcharts for explaining region segmentation processing according to the first embodiment.

Image processing according to embodiments of the present invention will be described below with reference to the accompanying drawings. Note that the following embodiments are not intended to limit the claims of the present invention, and not all the combinations of features described in the embodiments are necessarily essential to the solution of the present invention.

First Embodiment

The first embodiment according to the present invention will be described in detail with reference to FIGS. 1 to 4D. The first embodiment will be explained with respect to an example in which region segmentation is performed using an image processing apparatus.

[Apparatus Arrangement]

FIG. 1 is a block diagram showing the arrangement of the image processing apparatus that performs image region segmentation according to the first embodiment. In FIG. 1, a microprocessor (CPU) 11 controls the operation of each unit (to be described later) of the image processing apparatus by executing an operating system (OS), various programs, and the like stored in a storage unit 13 constituted by a read only memory (ROM), hard disk drive (HDD), flash memory, or the like using a random access memory (RAM) 12 as a working memory.

An image input unit 101 is constituted by an optical system device, a driver circuit that controls a photoelectric conversion device and a sensor, an analog-to-digital converter (ADC), a signal processing circuit that performs various image corrections, a frame buffer, and the like. The first embodiment assumes that the image input unit 101 inputs an RGB color image obtained by converting input light into a digital signal. The type and format of an input image in the present invention are not limited to an RGB image. A gray image representing the luminance, an image capturing the ultraviolet/infrared region of an invisible ray, or the like is also usable.

Assume that the nth pixel data $P_n$ in an image that is input by the image input unit 101 and is subjected to region segmentation according to the first embodiment has five elements:

$$P_n = \{Pr_n, Pg_n, Pb_n, Px_n, Py_n\} \quad (1)$$

where $(Pr_n, Pg_n, Pb_n)$ are the color information of the pixel n, and $(Px_n, Py_n)$ are the coordinates of the pixel n.

In the first embodiment, region segmentation by clustering is performed using the above five elements as feature amounts.

A representative point initialization unit 102 initializes the representative point of a region serving as a cluster center by referring to an image input by the image input unit 101. Then, the representative point initialization unit 102 stores, in a representative point holding unit 103, representative point data representing the initialized representative point. The representative point holding unit 103 is constituted by a large-capacity storage device such as an HDD, flash memory, or dynamic random access memory (DRAM). The representative point holding unit 103 saves pieces of information of representative point data C of each region, a cumulative value S of the region, and the number N of region pixels.

In the following description, $C_j$ is representative point data of the jth region, $S_j$ is the cumulative value of the region regarding the representative point data $C_j$, and $N_j$ is the number of region pixels. Each of the representative point data $C_j$ and the cumulative value $S_j$ of the region has five elements:

$$C_j = \{Cr_j, Cg_j, Cb_j, Cx_j, Cy_j\} \quad (2)$$

$$S_j = \{Sr_j, Sg_j, Sb_j, Sx_j, Sy_j\} \quad (3)$$

where $Cr_j$, $Cg_j$, and $Cb_j$ are the average values of respective pieces of color information R, G, and B of pixels belonging to the region of the representative point j, $Cx_j$ and $Cy_j$ are the average values of the respective coordinates X and Y of pixels belonging to the region of the representative point j, $Sr_j$, $Sg_j$, and $Sb_j$ are the cumulative values of the respective pieces of color information R, G, and B of pixels belonging to the region of the representative point j, and $Sx_j$ and $Sy_j$ are the cumulative values of the respective coordinates X and Y of pixels belonging to the region of the representative point j.

The number of pixels belonging to the region of the representative point j is the number $N_j$ of region pixels.

A block image generation unit 104 sequentially generates block images by dividing an image input by the image input unit 101 into blocks each of a predetermined size, and saves the block images in a block image buffer 105 serving as a working memory. The generated block image serves as the processing unit of region segmentation according to the first embodiment. The block image buffer 105 is constituted by a high-speed readable/writable storage device such as a static random access memory (SRAM).

A representative point buffer 107 is constituted by a high-speed readable/writable storage device such as an SRAM, and saves the representative point data C, the cumulative value S of a region, and the number N of region pixels that are used in a region segmentation unit 106. The representative point buffer 107 saves information of representative points in a block image (to be referred to as a "target block image" hereinafter) serving as the target of region segmentation, a block image (to be referred to as a "processed block image" hereinafter) for which region segmentation has been completed, and a block image (to be referred to as an "unprocessed block image" hereinafter) for which region segmentation has not been performed, details of which will be described later.

The region segmentation unit 106 performs clustering of pixels included in the target block image saved in the block image buffer 105 by using information of representative points saved in the representative point buffer 107. Although details of clustering will be described later, region segmentation by clustering using representative points in processed block images and unprocessed block images is performed to reduce the appearance of a region boundary arising from the shape of a block without an overlap of pixels between adjacent blocks.

A label map obtained by clustering in the region segmentation unit 106 is saved in a label map holding unit 109. The label map holding unit 109 is constituted by a large-capacity storage device such as an HDD, flash memory, or DRAM.

A representative point update unit 108 updates representative point data held in the representative point holding unit 103 by using information saved in the representative point buffer 107.

[Region Segmentation Processing]

Region segmentation processing according to the first embodiment will be explained with reference to the flowchart of FIG. 2A. FIG. 2A is a flowchart showing basic processing in the image processing apparatus having the arrangement shown in FIG. 1, and shows processing controlled by the CPU 11.

Figure 3B:
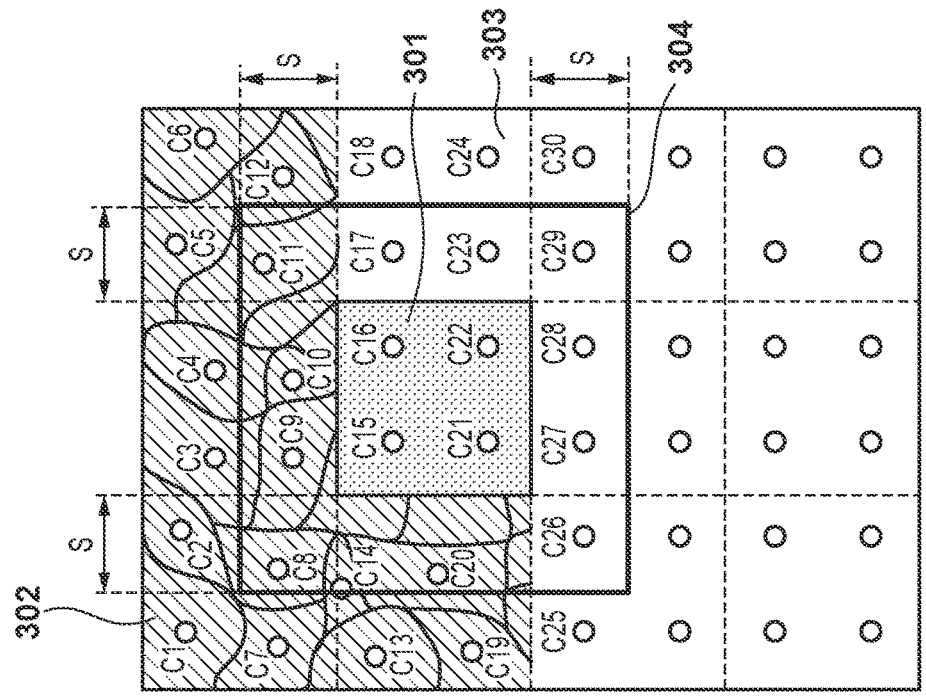
FIGS. 3A and 3B are views for explaining the disposition of representative points.
Figure 3A:
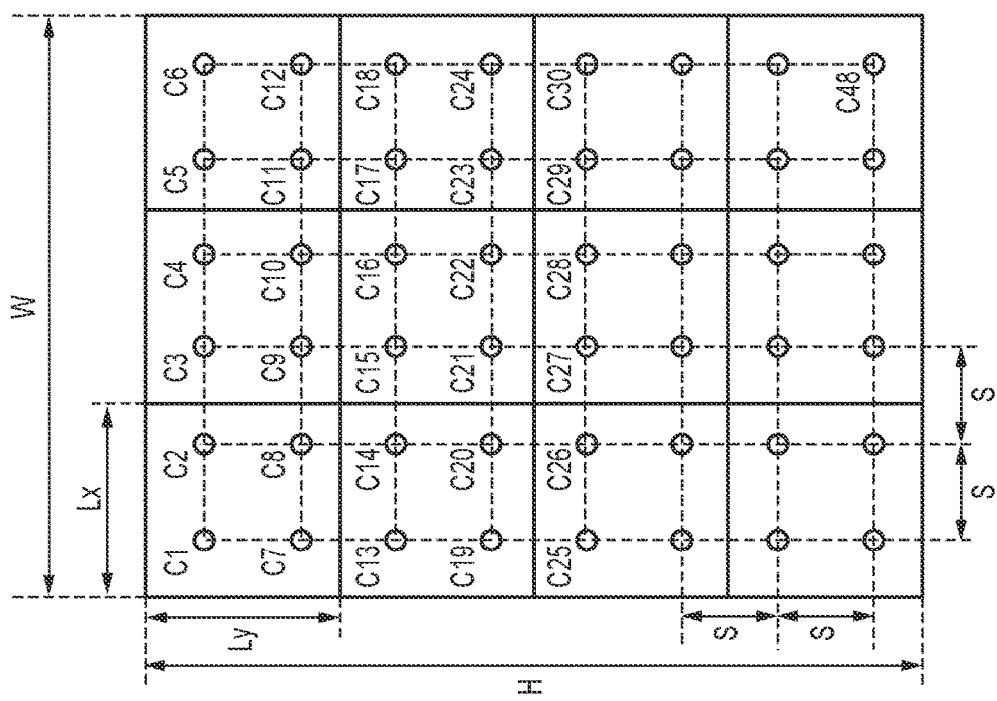

The representative point initialization unit 102 initializes representative points in an image serving as a region segmentation target, and stores representative point data in the representative point holding unit 103 (S201). In general, the result of region segmentation by clustering depends on the initial values of representative points. To reduce the initial value dependence, the coordinates ($Cx_j$, $Cy_j$) of the representative points in the image are initialized as follows. More specifically, as shown in FIG. 3A, the coordinates ($Cx_j$, $Cy_j$) of the representative points are initialized so that the representative points are disposed in a grid shape at an interval of S pixels in the image serving as the region segmentation target. The interval of S pixels between the representative points is desirably equal to or smaller than the search radius of a representative point for a pixel in clustering (to be described later). The following description assumes that the interval of S pixels between representative points is equal to the search range of clustering.

Each of the pieces of color information ($Cr_j$, $Cg_j$, $Cb_j$) of a representative point is initialized using the average value of a pixel positioned at the coordinates ($Cx_j$, $Cy_j$) and eight surrounding pixels:

$$Cr_j = (1/9) \Sigma_{a=-1}^{1} \Sigma_{b=-1}^{1} Ir(Cx_j+a, Cy_j+b) \quad (4)$$

$$Cg_j = (1/9) \Sigma_{a=-1}^{1} \Sigma_{b=-1}^{1} Ig(Cx_j+a, Cy_j+b) \quad (5)$$

$$Cb_j = (1/9) \Sigma_{a=-1}^{1} \Sigma_{b=-1}^{1} Ib(Cx_j+a, Cy_j+b) \quad (6)$$

where Ir(x, y), Ig(x, y), and Ib(x, y) are the color information R, G, and B of a pixel positioned at the pixel coordinates (x, y), respectively.

Also, the representative point initialization unit 102 initializes the cumulative value $S_j$ of the region and the number $N_j$ of region pixels to "0". As shown in FIG. 3A, representative points are disposed at the interval of S pixels with respect to an image having a width of W pixels and a height of H pixels. In an initial state, therefore, an image is divided into (W/S×H/S) regions. The representative point holding unit 103 holds the representative point data C, the cumulative value S of the region, and the number N of region pixels for each of the (W/S×H/S) regions.

The block image generation unit 104 generates block images each serving as a processing target by referring to an image input by the image input unit 101 (S202). As shown in FIG. 3A, an image having a W×H size is divided into block images each having a width of Lx pixels and a height of Ly pixels. For example, the image is divided into block images sequentially rightward from the upper left end. In every division, a block image is transferred to the block image buffer 105. After the end of transferring a block image at the right end, division and transfer are performed sequentially from a left end lower by one stage, and all block images are transferred. The block image buffer 105 thus requires a memory capacity capable of holding at least an image of one block (Lx×Ly pixels). Note that the block image generation order is not limited to this example, and block images may be generated in an arbitrary order.

After that, region segmentation of each block image generated in step S202 is performed by determination of reference representative point (S203), clustering (S204), update of representative point (S205), and convergence determination (S210). Region segmentation procedures for a block image of interest will be explained on the assumption that region segmentation has already been completed for several block images, as shown in FIG. 3B. More specifically, an example in which region segmentation of a target block image 301 is performed in a state in which processed block images 302 and unprocessed block images 303 exist for the target block image 301 will be explained.

Figure 4A:
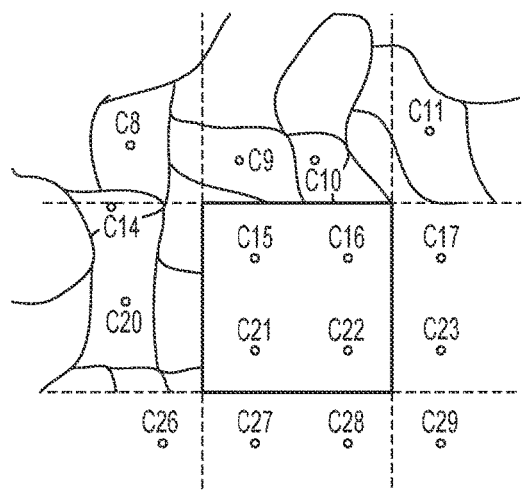
FIGS. 4A to 4D are views for explaining clustering and updating of representative points.
Figure 4B:
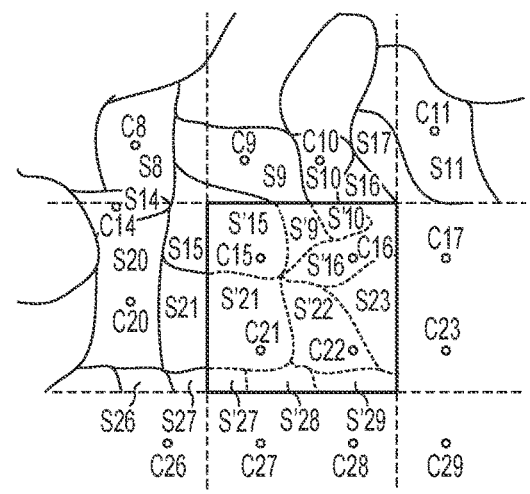
Figure 4C:
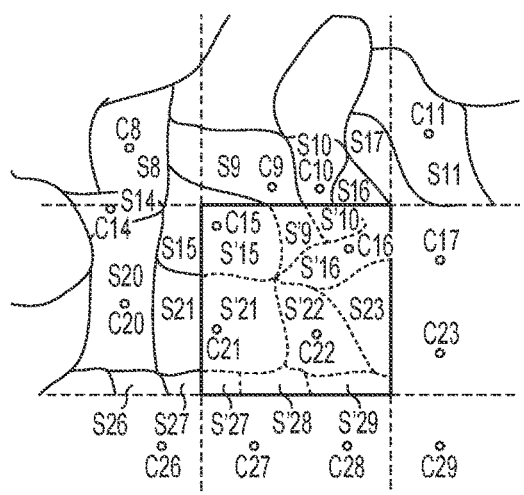
Figure 4D:
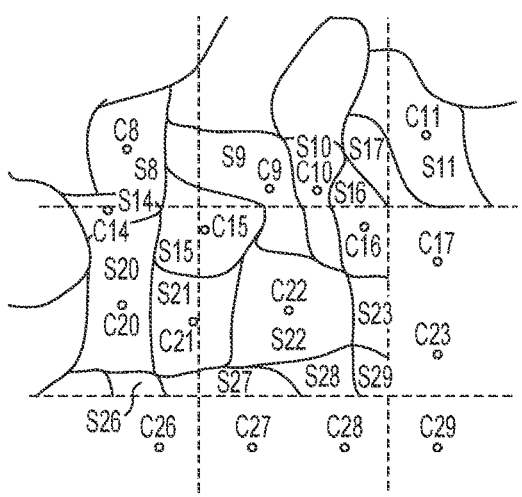

FIGS. 4A to 4D show region segmentation states in respective steps when performing region segmentation of the target block image 301. FIG. 4A shows a state before region segmentation of the target block image 301. FIG. 4B shows a region segmentation state after performing clustering once on the target block image 301. FIG. 4C shows a region segmentation state after updating representative points. FIG. 4D shows a state in which clustering of the target block image 301 is converged and region segmentation is completed.

In reference representative point determination (S203), the region segmentation unit 106 determines representative points (to be referred to as "reference representative points" hereinafter) that are referred to when performing region segmentation of the target block image 301. As for the determined reference representative points, the representative point initialization unit 102 copies, to the representative point buffer 107, representative point data, the cumulative values of regions, and the numbers of region pixels that are held in the representative point holding unit 103. That is, the representative point data $C_j$ used when performing region segmentation of the target block image 301, the cumulative values $S_j$ of regions and the numbers $N_j$ of region pixels in the processed block images 302, and the cumulative values $S'_j$ of regions and the numbers $N'_j$ of pixels in the target block image 301 are saved in the representative point buffer 107.

In clustering (S204) (to be described later), representative points present in a range S centered on a pixel within the target block image 301 are used. As shown in FIG. 3B, reference representative points used when performing region segmentation of the target block image 301 are a total of 16 points C8 to C11, C14 to C17, C20 to C23, and C26 to C29 included in a representative point search range 304. In reference representative point determination (S203), the region segmentation unit 106 stores information of these 16 points in the representative point buffer 107 to associate these reference representative points with the target block image 301. In this manner, according to the first embodiment, at the time of region segmentation of the target block image 301, representative points in the processed block images 302 adjacent to the upper left, top, upper right, and left of the target block image 301, and representative points in the unprocessed block images 303 adjacent to the right, lower left, bottom, and lower right of the target block image 301 are referred to, in addition to representative points in the target block image 301. The cumulative values $S'_j$ of regions and the numbers $N_j$ of region pixels in the target block image 301 are work data used in clustering (S204) and update of representative point (S205), and are initialized to "0" in reference representative point determination (S203).

In clustering (S204), the region segmentation unit 106 clusters each pixel of the target block image 301 to a corresponding representative point. More specifically, the feature space distance between a pixel and a representative point in the predetermined representative point search range 304 is calculated, and the pixel is clustered to a representative point having a minimum distance. The processing target pixel is set by scanning, in the raster order from the upper left end, the target block image 301 stored in the block image buffer 105. A representative point searched with respect to the pixel n is a reference representative point present in the range of S×S pixels centered on the coordinates ($Px_n$, $Py_n$) of the pixel n. More specifically, a feature space distance D(n, j) between the pixel n and a reference representative point j is calculated according to equations (7), (8), and (9), and the pixel n is clustered to a reference representative point $j_n$ having a minimum feature space distance, as represented by equation (10):

$$Dc(n,j)=(Pr_n-Cr_j)^2+(Pg_n-Cg_j)^2+(Pb_n-Cb_j)^2 \quad (7)$$

$$Ds(n,j)=(Px_n-Cx_j)^2+(Py_n-Cy_j)^2 \quad (8)$$

$$D(n,j)=Dc(n,j)+m \times Ds(n,j) \quad (9)$$

$$J_n=\arg\min_j(D(n,j)) \quad (10)$$

where assume that the coordinates $(Cx_j, Cy_j)$ of the reference representative point j satisfy the conditions of relations (11) and (12):

$$Px_n-S \leq Cx_j < Px_n+S \quad (11)$$

$$Py_n-S \leq Cy_j < Py_n+S \quad (12)$$

where Dc(n, j) in equation (7) is the color space distance,
Ds(n, j) in equation (8) is the coordinate space distance,
D(n, j) in equation (9) is the linear sum of Dc(n, j) and Ds(n, j), and
m is the coefficient for changing the weights of the color space distance and coordinate space distance.

The reference representative point $j_n$ is the label of a region to which the pixel n belongs, and is saved in the label map holding unit 109.

In clustering (S204), the pixel n is clustered to the reference representative point $j_n$, and then the cumulative value $S'_j$ of the region and the number $N'_j$ of region pixels in the target block image 301 are calculated.

After the end of clustering in step S204 on the target block image 301 shown at the center of FIG. 4A, a region segmentation state shown in FIG. 4B is obtained. In region segmentation of the target block image 301, the representative points of the unprocessed block images 303 are also used in addition to the representative points of the target block image 301 and processed block images 302. This enables region segmentation in which the appearance of a region boundary arising from the shape of a block is reduced without an overlap of pixels between adjacent blocks, as shown in FIG. 4B.

After clustering (S204), the representative point update unit 108 updates information of reference representative points in the representative point buffer 107 (S205). That is, the reference representative point data $C_j$ in the target block image 301 and the processed block images 302 are updated according to equation (13) using the cumulative values $S_j$ of the regions and the numbers $N_j$ of region pixels in the processed block images 302, and the cumulative values $S'_j$ of the regions and the numbers $N'_j$ of region pixels in the target block image 301:

$$C_j=(S_j+S'_j)/(N_j+N'_j) \quad (13)$$

where $C_j$, $S_j$, $N_j$, $S'_j$, and $N'_j$ are held in the representative point buffer 107.

That is, not only the color information but also coordinates of the reference representative point data $C_j$ are updated by updating the respective elements of the reference representative point data $C_j$ for each clustered region as an average value in this region.

FIG. 4C shows a region segmentation state after updating the reference representative points in the region segmentation state at the end of clustering (S204) shown in FIG. 4B. At this stage, the reference representative points in the unprocessed block images 303 do not have regions in the unprocessed block images 303. If the reference representative points in the unprocessed block images 303 are updated according to equation (13), these representative points move into the target block image 301, and a bias is generated in the representative points in the unprocessed block images 303, decreasing the accuracy of region segmentation. The representative point update unit 108 thus avoids improper updating of the reference representative points in the unprocessed block images 303 by setting, as update targets, only the reference representative points in the target block image 301 and the processed block images 302 without updating the reference representative points in the unprocessed block images 303.

Representative Point Updating

Figure 2B:
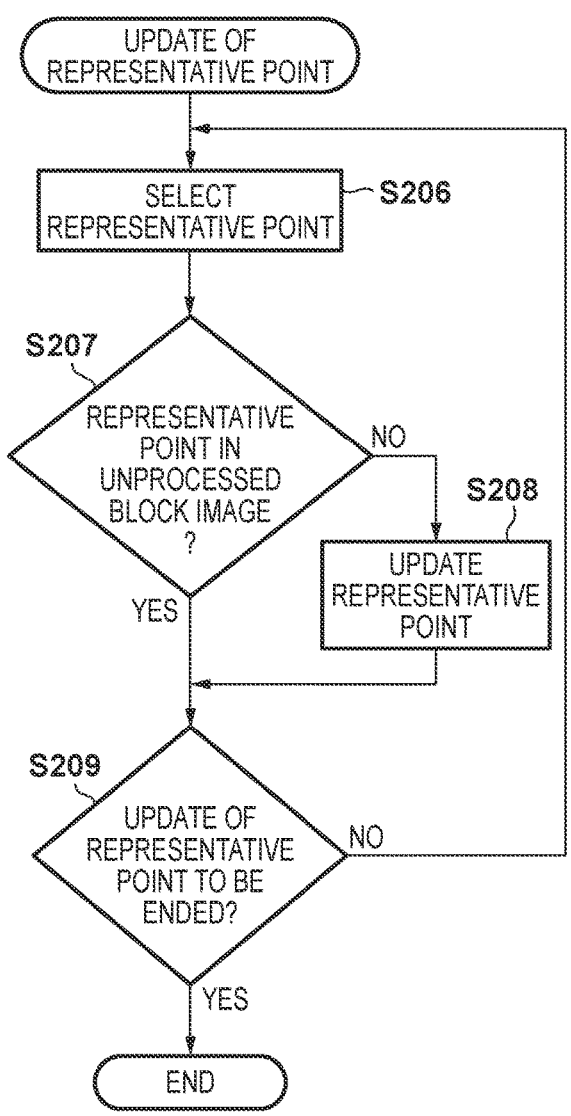

In update of representative point (S205), processes in steps S206 to S209 shown in FIG. 2B are performed. First, the representative point update unit 108 selects one representative point from reference representative points held in the representative point buffer 107 (S206). Then, the representative point update unit 108 determines whether the selected representative point is a representative point in the unprocessed block image 303 (S207). Although a block containing a representative point is known at the time of initialization of the representative point, the determination in step S207 may be performed using coordinate information of the representative point. For example, when the coordinates $(Cx_j, Cy_j)$ of the representative point j satisfy at least either of equations (14) and (15), it can be determined that this representative point is a representative point in the unprocessed block image 303:

$$Cx_j > Xr \quad (14)$$

$$Cy_j > Yr \quad (15)$$

where Xr is the coordinate of the right end of the target block image 301, and
Yr is the coordinate of the lower end of the target block image 301.

If the representative point update unit 108 determines that the selected representative point is not a representative point in the unprocessed block image 303, it updates the representative point according to equation (13) (S208). For example, in FIG. 3B, representative points C8, C9, C10, C11, C14, and C20 positioned in the processed block images 302, and representative points C15, C16, C21, and C22 positioned in the target block image 301 are updated. In contrast, representative points C17, C23, C26, C27, C28, and C29 positioned in the unprocessed block images 303 are not updated. This has an effect of reducing the processing amount of update of representative point (S205) by excluding representative points in the unprocessed block images 303 from update targets.

The representative point update unit 108 determines whether update determination and updating of all reference representative points in the representative point buffer 107 have been completed (S209). The representative point update unit 108 repeats the processes in steps S206 to S208 till the completion of update determination and updating of all reference representative points.

After Representative Point Updating

Referring back to FIG. 2A, the representative point update unit 108 determines whether clustering of the target block image 301 has been converged (S210). This convergence determination is performed using the average value of the distance between each pixel and a representative point to which the pixel belongs. If the average value is smaller than a predetermined threshold, it is determined that clustering has been converged, and clustering (S204) of the target block image 301 and update of representative point (S205) end. If the average value is equal to or larger than the threshold, it is determined that clustering has not been converged, and clustering (S204) of the target block image 301 and update of representative point (S205) are repeated. Note that the convergence determination method is not limited to this example. Clustering (S204) and update of representative point (S205) may be repeated a fixed number of times such as three or 10 times without performing convergence determination.

If the representative point update unit 108 determines that clustering has not been converged, it initializes $S'_j$ and $N'_j$ in the representative point buffer 107 to "0", and returns the process to step S204. The region segmentation unit 106 performs clustering (S204) using the representative points updated in step S205. Subsequently, clustering (S204) and update of representative point (S205) are repeated until clustering of the target block image 301 is converged.

If the representative point update unit 108 determines that clustering has been converged, it ends the processing of the target block image 301 and advances the process to step S211. FIG. 4D shows a state in which clustering (S204) and update of representative point (S205) are repeated after the region segmentation state shown in FIG. 4C, and clustering of the target block image 301 is converged.

After that, the representative point update unit 108 updates representative point information in the representative point holding unit 103 (S211). First, the representative point update unit 108 replaces representative point data $C_j$ in the representative point holding unit 103 with representative point data $C_j$ saved in the representative point buffer 107. According to equations (16) and (17), the representative point update unit 108 updates the cumulative value $S_j$ of a region and the number $N_j$ of region pixels that are held in the representative point holding unit 103:

$$S_j = S_j + S'_j \quad (16)$$

$$N_j = N_j + N'_j \quad (17)$$

Then, the region segmentation unit 106 determines whether processing for all block images has ended (S212). If an unprocessed block image remains, the region segmentation unit 106 returns the process to step S202 in order to perform region segmentation of the next block image. The processes in steps S202 to S211 are repeated based on the determination in step S212, and region segmentation of all block images ends, achieving region segmentation of the entire image.

As described above, when performing region segmentation by clustering on a target block image, even representative points in processed blocks and unprocessed blocks are referred to. This can reduce the appearance of a region boundary arising from the shape of a block without an overlap of pixels between blocks. Since pixels do not overlap each other between blocks, the memory capacity of the working memory for temporarily holding a block image can be reduced.

Second Embodiment

The second embodiment according to the present invention will be described. The above-described first embodiment was explained with respect to an image processing apparatus that implements region segmentation according to the present invention by hardware. The second embodiment will describe an example in which region segmentation according to the present invention is implemented by software. Region segmentation according to the present invention repetitively uses a block image smaller than a conventional one. The implementation of the present invention by software has an effect of increasing the cache hit ratio.

[System Arrangement]

Figure 5:
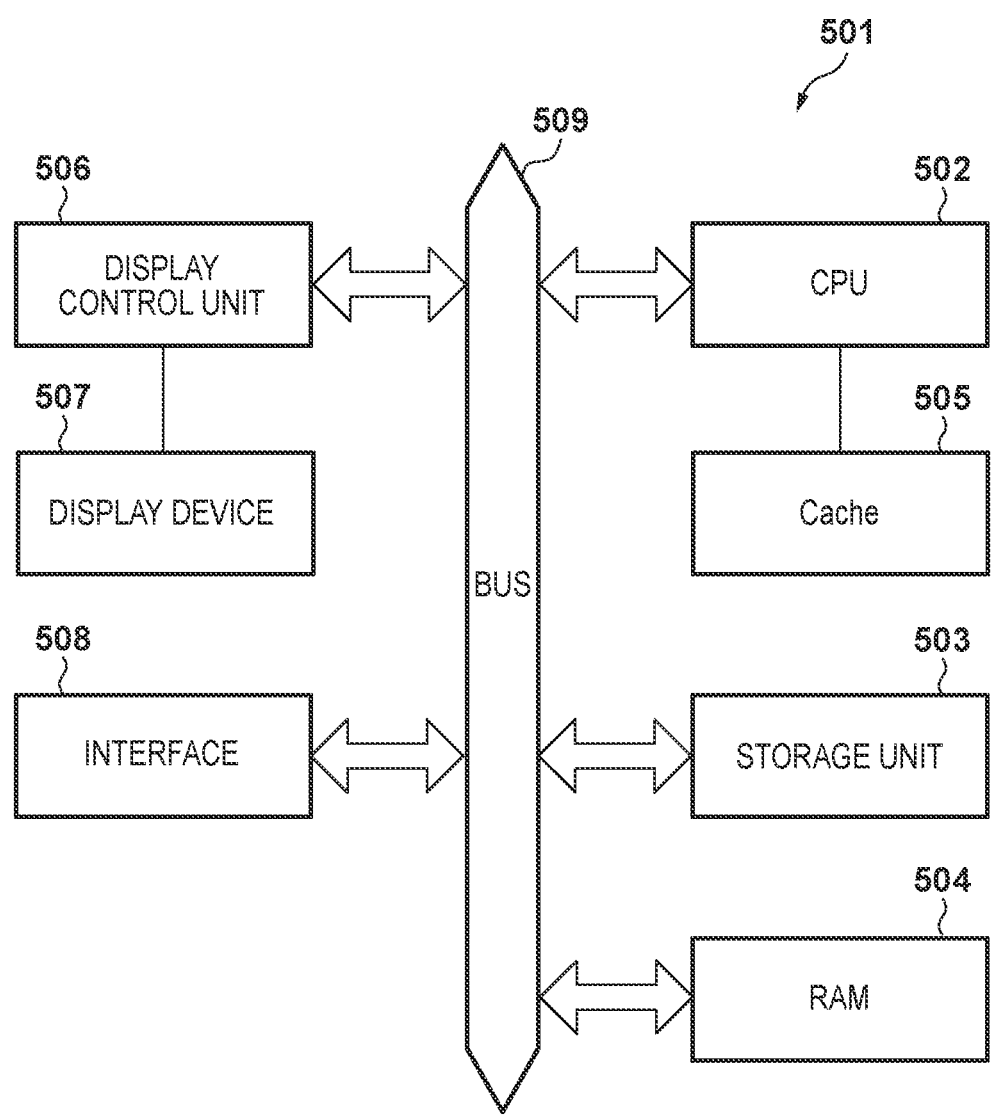
FIG. 5 is a block diagram showing the arrangement of a computer apparatus that performs region segmentation processing according to the second embodiment.

FIG. 5 is a block diagram showing the arrangement of a computer apparatus 501 capable of implementing region segmentation processing according to the second embodiment.

In FIG. 5, a CPU 502 controls the overall computer apparatus 501. A storage unit 503 is a ROM or flash memory that stores a boot program, a basic input output system (BIOS) program, an OS, software for executing image region segmentation, and the like. A RAM 504 is used as the working area of the CPU 502. A cache 505 is used to speed up access from the CPU 502 to various data. A display control unit 506 incorporates a video memory and display controller, and controls display by a display device 507. The display device 507 receives a video signal from the display control unit 506 and displays an image represented by the video signal. An interface 508 is used to communicate with various external devices such as an image input device. These building components perform data communication through a bus 509.

[Region Segmentation Processing]

Figure 6A:
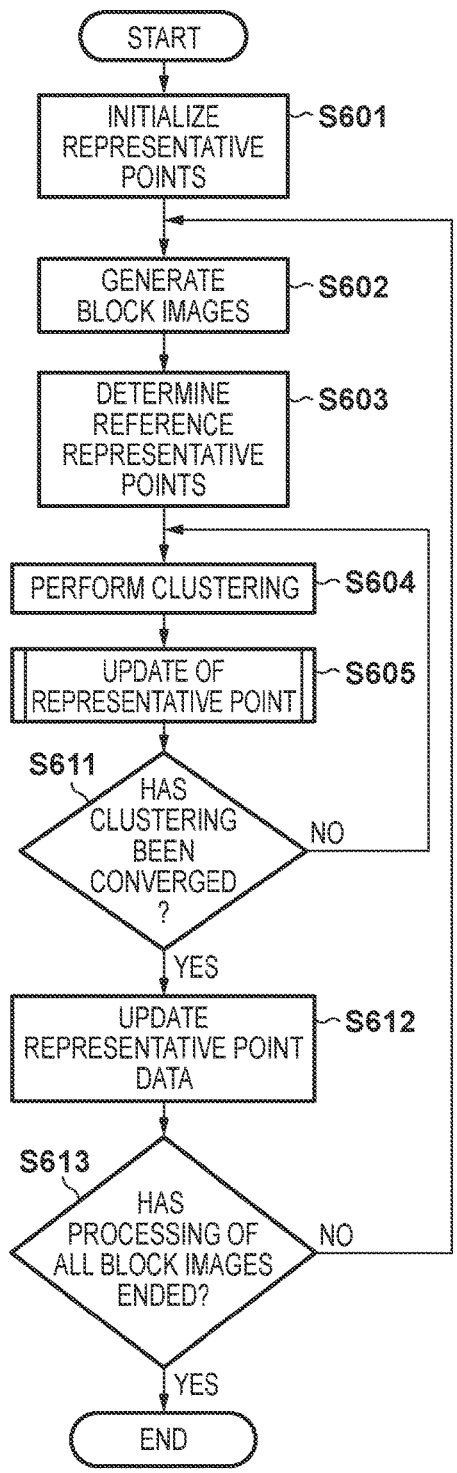
FIGS. 6A and 6B are flowcharts for explaining region segmentation processing according to the second embodiment.

Processing by region segmentation software running on the computer apparatus 501 will be explained. FIG. 6A is a flowchart when the same region segmentation as that in the first embodiment is executed by software in the second embodiment.

The CPU 502 initializes representative points (S601). At this time, representative point data, the cumulative values of regions, and the numbers of region pixels are initialized, as in the first embodiment.

The CPU 502 sets a target block image serving as the target of region segmentation (S602). That is, block images generated as in the first embodiment from an image input from the interface 508 are sequentially stored in a predetermined area of the RAM 504.

The CPU 502 determines reference representative points used when performing region segmentation of the target block image (S603). As in the first embodiment, reference representative points used in clustering (S604) and representative point updating (S605) (to be described later) are determined, and the cumulative values $S'_j$ of regions and the numbers $N'_j$ of pixels in the target block image serving as work data are initialized to "0".

Thereafter, the CPU 502 performs region segmentation of the target block image (S604). That is, the pixels of the target block are scanned in the raster order, and clustering based on reference representative points is performed as in the first embodiment.

The CPU 502 updates reference representative points (S605). The first embodiment has described an example in which only reference representative points in processed block images and a target block image are updated, and reference representative points in unprocessed block images are not updated. By this processing, the first embodiment prevents occurrence of improper updating in which reference representative points in unprocessed block images move into a target block image. The second embodiment will describe an example in which updating is performed on even reference representative points in unprocessed block images while avoiding movement of the reference representative points in the unprocessed block images into the target block.

Representative Point Updating

Figure 6B:
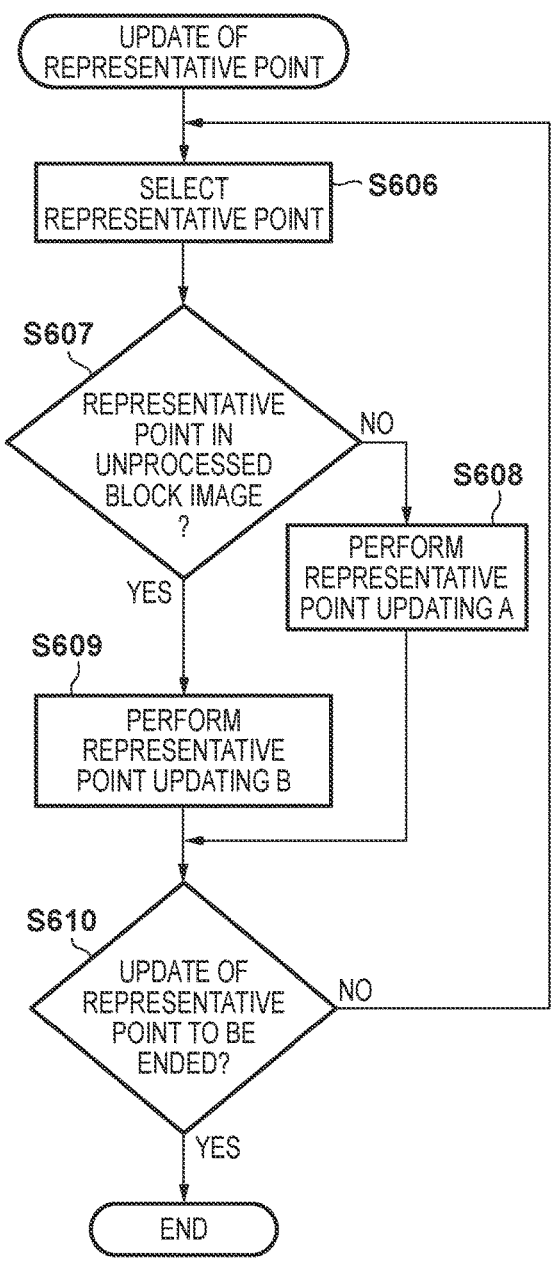

In representative point updating (S605), processes in steps S606 to S610 shown in FIG. 6B are performed. First, the CPU 502 selects one representative point from reference representative points determined in step S603 (S606), and determines whether the selected representative point is a representative point in an unprocessed block image (S607). If the selected representative point is not a representative point in the unprocessed block image, representative point updating (to be referred to as "representative point updating A" hereinafter) using the first method according to the above-mentioned equation (13) as in the first embodiment is performed (S608). If the selected representative point is a representative point in the unprocessed block image, representative point updating (to be referred to as "representative point updating B" hereinafter) using the second method according to equation (18) is performed (S609):

$$C'_j = (S^2 \times C_j + S_j + S'_j)/(S^2 + N_j + N'_j) \qquad (18)$$

where S is the disposition interval (see FIG. 3A) of the initial value of a representative point, as in the first embodiment, and $S^2 \times C_j$ is the cumulative value of a rectangular region of S×S pixels centered on the representative point in the same color as that of the representative point.

Equation (18) is a representative point update equation on the assumption that there is a rectangular region of the S×S size centered on the representative point in the same color as that of the representative point. In representative point updating B according to equation (18), the change amount of coordinates along with updating of a representative point becomes smaller than that in representative point updating A according to equation (13). Representative point updating B can therefore reduce generation of substantial updating of the coordinates of a representative point in which a representative point in an unprocessed block image moves to a target block image by one updating.

Note that the update equation of a representative point in an unprocessed block image is not limited to equation (18), and another update equation may also be used unless a large change amount is generated especially at the coordinates of a representative point, as in equation (13). In other words, in updating of a representative point in an unprocessed block image, the change amount of the coordinates of a representative point before and after updating becomes smaller than that in updating of reference representative points in a target block image and processed block images.

Since updating of a representative point in an unprocessed block image is kept small, the value of the representative point in the unprocessed block image is updated little by little. While reducing a bias of representative points, the initial value dependence of the representative point can be reduced.

After that, the CPU 502 determines whether updating of all reference representative points has been completed (S610), and repeats the processes in steps S606 to S609 till the completion of updating all reference representative points.

After Representative Point Updating

Referring back to FIG. 6A, the CPU 502 determines whether clustering of the target block image has been converged (S611), and repeats clustering (S604) and representative point updating (S605) till convergence. This convergence determination suffices to be performed based on the average value of the distance between each pixel and a representative point to which the pixel belongs, as in step S210 according to the first embodiment. Since the computer apparatus 501 according to the second embodiment includes the cache 505, reference to a block image can be performed quickly. Since there is no overlap of pixels between blocks even in the second embodiment, improvement of the cache hit ratio can be expected by the absence of the overlap. If a reference representative point determined in step S603 is transferred to the cache 505 in advance and cache locking is performed, the cache hit ratio can be further increased.

The CPU 502 performs updating of representative point data (S612). That is, information of the reference representative point updated in step S605 is reflected in information of all representative points. In other words, as in step S211 according to the first embodiment, representative point data $C_j$ of the reference representative point updated in step S605, the cumulative value $S_j$ of the region, and the number $N_j$ of region pixels are updated.

The CPU 502 determines whether processing for all block images has ended (S613). The CPU 502 repeats the processes in steps S602 to S612 till the end of processing for all block images.

In this fashion, when performing region segmentation of a target block image, improvement of the cache hit ratio is expected by eliminating an overlap of pixels between blocks. The processing speed can be increased even in a computer apparatus having a small memory capacity of the cache.

Note that the second embodiment has been explained with respect to an example in which representative points in a target block image and representative points in processed block images are updated by the method of representative point updating A, and representative points in unprocessed block images are updated by the method of representative point updating B. This updating of representative points in unprocessed block images is also applicable to the above-described first embodiment. To the contrary, even in the second embodiment, as in the first embodiment, updating may not be performed for representative points in unprocessed block images.

Third Embodiment

The third embodiment according to the present invention will be described. Note that the arrangement of an image processing apparatus that performs region segmentation according to the third embodiment is the same as that according to the first embodiment, and a description thereof will not be repeated.

The first embodiment has been described with respect to an example in which block images are generated so as not to provide an overlapping pixel between adjacent blocks. The third embodiment will be described with respect to an example in which overlapping pixels are provided between adjacent blocks similarly to the method described in literature 2 in region segmentation according to the first embodiment.

Overlapping pixels undergo clustering in a plurality of block images. Even when a pixel near a block boundary cannot be appropriately clustered upon performing region segmentation of a given block image, the clustering result may be improved by region segmentation of an adjacent block image. This advantage is the same as that in the method described in literature 2. In the third embodiment, however, representative points in unprocessed block images are referred to, so the same effect can be obtained by an overlap of a smaller number of pixels than that in the method described in literature 2.

Assume that an overlap of k pixels is provided at each of the top, bottom, left, and right of a block when dividing an image having a size of W×H pixels into block images each having a width of Lx pixels and a height of Ly pixels. In this case, a block image buffer 105 that holds a block image requires a memory capacity of (W/Lx+k)×(H/Ly+k) pixels.

Figure 7:
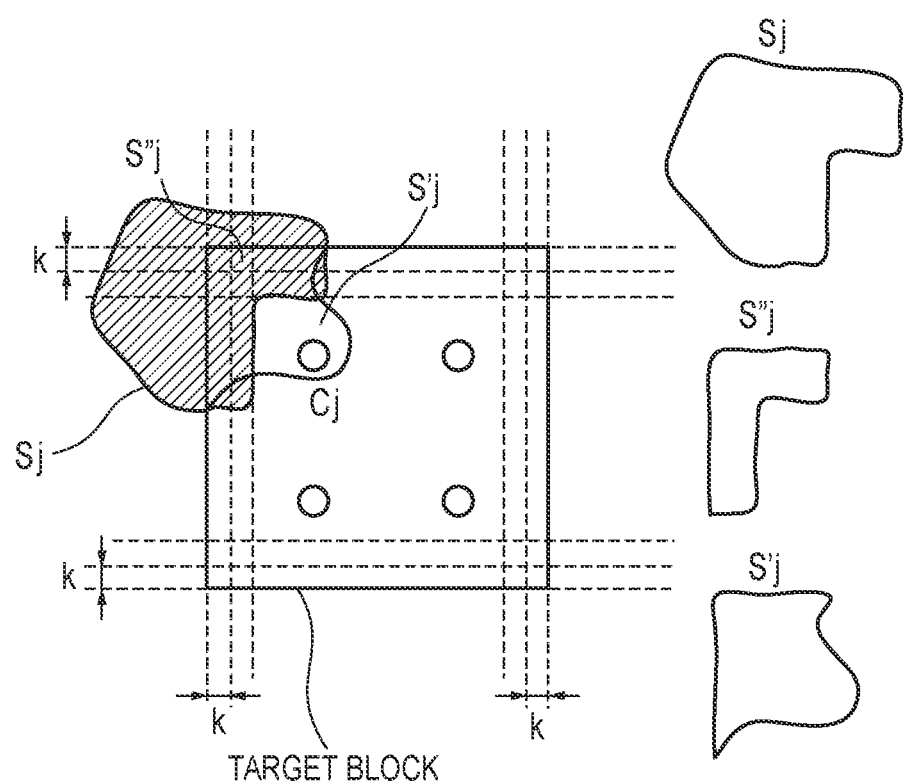
FIG. 7 is a view for explaining an overlap of pixels between blocks according to the third embodiment.

When an overlap of pixels is provided between adjacent blocks, the pixels in the overlapping region are clustered in a plurality of block images, as shown in FIG. 7. In the third embodiment, therefore, when updating representative points, equation (13) described in the first embodiment is replaced with equation (19) to perform calculation so as not to take the cumulative value of the overlapping region:

$$C_j=(S_j+S'_j-S''_j)/(N_j+N'_j-N''_j) \quad (19)$$

where $S''_j$ and $N''_j$ are the cumulative value of a region and the number of region pixels present in a target block image, out of regions belonging to the representative point j before updating, as shown in FIG. 7.

The first embodiment has described an example in which the cumulative value of a region before updating is saved when updating representative points. However, updating of representative points may be performed using the number of region pixels and the color average without saving the cumulative value of a region before updating. That is, equation (13) described in the first embodiment may be replaced with equation (20):

$$C_j=(C_j \times N_j+S'_j)/(N_j+N'_j) \quad (20)$$

In this case, a representative point holding unit 103 suffices to hold only the representative point data $C_j$ and the number $N_j$ of region pixels. That is, a representative point buffer 107 suffices to hold the representative point data $C_j$, the number $N_j$ of region pixels in processed block images, and the cumulative values $S'_j$ of regions and the numbers $N'_j$ of region pixels in a target block image.

In this way, while optimizing region segmentation by providing overlapping pixels between adjacent blocks, the image quality at a region boundary is improved by clustering in which the representative points of unprocessed block images are referred to, as in the first embodiment. At this time, since the number of overlapping pixels between blocks can be smaller than that in the technique described in literature 2, the memory capacity of the working memory used as a block image buffer can be reduced.

Modification of Embodiments

The above-described first and second embodiments have been explained with respect to an example in which color information of a representative point is initialized using the average value of a pixel corresponding to the representative point and surrounding pixels, in order to reduce the initial value dependence of the representative point. However, the representative point initialization method is not limited to this example. For example, color information of a representative point may be initialized using the median of a pixel corresponding to the representative point and surrounding pixels.

Also, the above-described first and second embodiments have been explained with respect to an example of clustering based on the SLIC (Simple Linear Iterative Clustering) method described in literature 1. However, the present invention is not limited to this, and the texture or the like may be included as a feature amount or the representative point reference range may be changed. The present invention has the same effect as those of the first and second embodiments for a region segmentation method of defining representative points and clustering pixels.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-167959 filed Aug. 20, 2014 which is hereby incorporated by reference herein in its entirety.

What is claimed is:

1. An image processing apparatus for performing region segmentation of an image, comprising:
    a setting unit configured to set a plurality of representative points on an input image;
    a selection unit configured to sequentially select a block from a plurality of blocks, which are generated by dividing the input image, as a target block; and
    a segmentation unit configured to perform region segmentation of the input image by clustering of pixels contained in the target block by referring to information of a representative point in the target block, and information of a representative point in at least one block adjacent to the target block including an unprocessed block in which the clustering of pixels has not been performed yet,
    wherein at least one of the setting unit, the selection unit, and the segmentation unit is implemented using a processor.

2. The apparatus according to claim 1, wherein the information of the representative point in the target block includes position information.

3. The apparatus according to claim 1, wherein the information of the representative point in the target block includes color information.

4. The apparatus according to claim 1, wherein the segmentation unit performs clustering of a pixel of interest in the target block by referring to information of representative points which exist in a predetermined range around a position of the pixel of interest.

5. The apparatus according to claim 1, further comprising an update unit configured to update the information of the representative point in the target block after the clustering of pixels in the target block, wherein the update unit is implemented using a processor.

6. The apparatus according to claim 5, wherein, until it is determined that the clustering in the target block has converged, the segmentation unit repeats the clustering of pixels in the target block by referring to the updated information of the representative point in the target block, and the update unit repeats the update of the information of the representative point in the target block.

7. The apparatus according to claim 5, wherein the update unit is configured to update information of the representative point as an average value of information of pixels clustered to the representative point.

8. The apparatus according to claim 1, wherein the segmentation unit performs the region segmentation by further referring to information of a representative point in at least one block adjacent to the target block including a processed block in which the clustering of pixels has already been performed.

9. The apparatus according to claim 8, further comprising an update unit configured to update the information of the representative points in the target block and the processed block adjacent to the target block after the clustering of pixels in the target block, wherein the update unit is implemented using a processor.

10. The apparatus according to claim 9, wherein the update unit does not update information of the representative point in the unprocessed block adjacent to the target block.

11. The apparatus according to claim 1, further comprising an initialization unit configured to initialize position information of the plurality of representative points so that those representation points are disposed in a grid shape in the input image, wherein the initialization unit is implemented using a processor.

12. The apparatus according to claim 11, wherein the initialization unit initializes color information of each of the plurality of representative points based on color information of a pixel corresponding to the representative point and color information of surrounding pixels of the corresponding pixel.

13. The apparatus according to claim 1, wherein the plurality of blocks are generated by dividing the input image so that a pixel does not overlap between blocks adjacent to each other.

14. The apparatus according to claim 1, wherein the plurality of blocks are generated by dividing the input image so that at least one pixel overlaps between blocks adjacent to each other.

15. The apparatus according to claim 1, further comprising:

a first buffer configured to hold an image of the target block; and a second buffer configured to hold the information of the representative point in the target block and the information of the representative point in the unprocessed block adjacent to the target block, wherein the segmentation unit performs the clustering of pixels in the image of the target block held in the first buffer by referring to the information of the representative points held in the second buffer.

16. The apparatus according to claim 15, wherein the second buffer is configured to further hold the information of the representative point in the processed block adjacent to the target block.

17. An image processing method of performing region segmentation of an image, comprising:

setting a plurality of representative points on an input image;

sequentially selecting a block from a plurality of blocks, which are generated by dividing the input image, as a target block; and performing region segmentation of the input image by clustering of pixels contained in the target block by referring to information of a representative point in the target block, and information of a representative point in at least one block adjacent to the target block including an unprocessed block in which the clustering of pixels has not been performed yet.

18. A non-transitory computer readable medium storing a computer-executable program for causing a computer to perform an image processing method, the method comprising steps of:

setting a plurality of representative points on an input image;

sequentially selecting a block from a plurality of blocks, which are generated by dividing the input image, as a target block; and performing region segmentation of the input image by clustering of pixels contained in the target block by referring to information of a representative point in the target block, and information of a representative point in at least one block adjacent to the target block including an unprocessed block in which the clustering of pixels has not been performed yet.

* * * * *